(12) United States Patent
Chang et al.

(10) Patent No.: US 8,851,440 B2
(45) Date of Patent: Oct. 7, 2014

(54) RELEASABLE HANGING SYSTEM

(75) Inventors: Bob Yusuo Chang, Concord, NH (US);
Peter J. Mueller, Manchester, NH (US)

(73) Assignee: Velcro Industries B.V., Willemstad (CW)

( * ) Notice: Subject to any disclaimer, the term of this patent is extended or adjusted under 35 U.S.C. 154(b) by 363 days.

(21) Appl. No.: 13/226,194

(22) Filed: Sep. 6, 2011

(65) Prior Publication Data

US 2012/0074275 A1 Mar. 29, 2012

Related U.S. Application Data

(60) Provisional application No. 61/387,937, filed on Sep. 29, 2010.

(51) Int. Cl.
| | | |
|---|---|---|
| *A47G 1/16* | (2006.01) | |
| *F16M 13/02* | (2006.01) | |
| *A47G 1/17* | (2006.01) | |
| *F16B 1/00* | (2006.01) | |

(52) U.S. Cl.
CPC ...... *F16M 13/022* (2013.01); *F16B 2001/0028* (2013.01); *A47G 1/17* (2013.01)
USPC ...................... 248/489; 248/475.1; 248/205.2

(58) Field of Classification Search
USPC ........... 248/205.3, 690, 205.2, 466, 467, 477, 248/489
See application file for complete search history.

(56) References Cited

U.S. PATENT DOCUMENTS

| | | | |
|---|---|---|---|
| 4,310,137 A | 1/1982 | Frye | |
| 4,984,339 A | 1/1991 | Provost et al. | |
| 5,860,194 A * | 1/1999 | Takizawa et al. | 24/452 |
| 5,922,161 A | 7/1999 | Wu et al. | |
| 5,989,708 A | 11/1999 | Kreckel | |
| 6,245,177 B1 | 6/2001 | Lühmann | |

(Continued)

FOREIGN PATENT DOCUMENTS

| | | |
|---|---|---|
| DE | 19853541 A1 | 5/2000 |
| LU | 64754 A1 | 9/1973 |
| WO | WO9931193 A1 | 6/1999 |
| WO | WO2012050827 A3 | 11/2012 |

OTHER PUBLICATIONS

International Search Report and Written Opinion for PCT/US2011/053446 mailed Aug. 14, 2012, 10 pages.

(Continued)

*Primary Examiner* — Gwendolyn W Baxter
(74) *Attorney, Agent, or Firm* — Fish & Richardson P.C.

(57) ABSTRACT

A releasable hanging system having a loop fastener component and a hook fastener component. The loop fastener component includes a flexible patch carrying a field of engageable fibers exposed on a front side of the patch and an adhesive on a back side of the patch. The hook fastener component includes a resin base carrying an array of male touch fastener elements. A significant majority of the male touch fastener elements each extend from the base to a distal tip to overhang the base in a single, common direction. The fastening system can be used to hang an object on a vertical surface such that the male touch fastener elements of the significant majority bear the weight of the object in a downward direction, and such that the significant majority of the male touch fastener elements are oriented so as not to inhibit lifting of the object in an upward direction.

4 Claims, 14 Drawing Sheets

(56) References Cited

U.S. PATENT DOCUMENTS

| | | |
|---|---|---|
| 6,254,304 B1 | 7/2001 | Takizawa et al. |
| 6,499,707 B2 | 12/2002 | Hamerski et al. |
| 6,527,900 B1 | 3/2003 | Kreckel et al. |
| 6,641,892 B2 | 11/2003 | Lühmann |
| 6,815,873 B2 | 11/2004 | Johnson et al. |
| 6,972,141 B1 | 12/2005 | Bries et al. |
| 7,008,758 B2 | 3/2006 | Park et al. |
| 7,078,093 B2 | 7/2006 | Sheridan et al. |
| 7,162,780 B2 * | 1/2007 | Martin et al. .................. 24/452 |
| 7,308,738 B2 | 12/2007 | Barvosa et al. |
| 7,414,088 B1 | 8/2008 | Ford et al. |
| 2002/0197474 A1 | 12/2002 | Reynolds |
| 2006/0115640 A1 | 6/2006 | Yodh et al. |
| 2006/0249711 A1 | 11/2006 | Niu et al. |
| 2007/0298669 A1 | 12/2007 | Barrera et al. |
| 2008/0176983 A1 | 7/2008 | Niu et al. |
| 2008/0213487 A1 | 9/2008 | Park et al. |
| 2009/0217492 A1 | 9/2009 | Gallant et al. |
| 2009/0282802 A1 | 11/2009 | Cooper et al. |
| 2009/0301349 A1 | 12/2009 | Afzali-Ardakani et al. |

OTHER PUBLICATIONS

International Preliminary Report on Patentability; Rasmussen; Jan. 22, 2013; World Intellectual Property Organization (WIPO) (International Bureau of); PCT/US2011/053446; 8 pages.

* cited by examiner

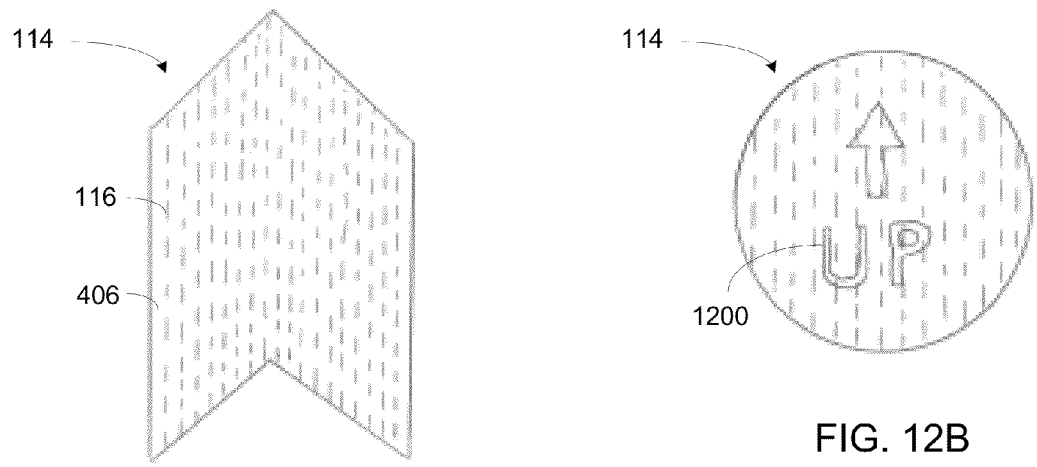
FIG. 12A
FIG. 12B
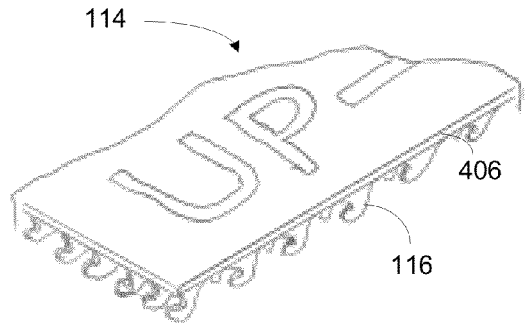
FIG. 12C
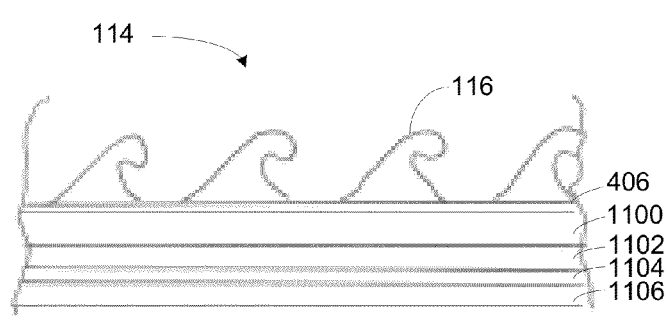
FIG. 11

RELEASABLE HANGING SYSTEM

This application claims priority under 35 U.S.C. §119(e) from U.S. provisional patent application No. 61/387,937, filed Sep. 29, 2010, the entire contents of which are hereby incorporated by reference.

TECHNICAL FIELD

This invention relates to releasably and adjustably hanging objects on surfaces such as walls, and to releasable hanging systems.

BACKGROUND

There are many ways to hang things on walls. Some make permanent holes in the wall, such as nails and tacks. Others rely on adhesive, but some adhesives used for hanging things damage the walls upon removal. More recently, adhesive hanging systems have been introduced that can be removed without damage to most wall surfaces, by progressively stretching the adhesive in a shear mode to detach a rigid hook hanger, for example, from the wall.

Some things hung on walls are flexible, such as posters and papers. Others, such as framed pictures and art, are rigid and present greater difficulties in removal if adhesively attached to walls, because they can not be flexed to peel them from the wall.

When using some hanging techniques, care must be taken to properly align and place the hanging components, so that the object being hung ends up level and at the desired height, for example.

Other systems for releasably hanging things, particularly rigid things, on surfaces such as walls, are sought.

SUMMARY

In general, various innovative aspects of the subject matter described in this specification feature a releasable hanging system including a loop fastener component and a hook fastener component in combination with one or more of the innovative aspects described below.

In a first aspect, hanging an object with a releasable hanging system includes selecting a desired orientation of the object with respect to a vertical surface having a first field of touch fastener elements and securing a second field of touch fastener elements to a back side of the object. One of the first and second touch fastener element fields includes an array of male touch fastener elements, each extending from a common base. The other of the first and second touch fastener element fields includes a multiplicity of fibers distributed over an area and engageable by the male touch fastener elements. The object is hung on the vertical surface with the fibers releasably engaged by the male touch fastener elements.

In a second aspect, hanging an object with a releasable hanging system includes selecting a desired orientation of the object with respect to a vertical surface and securing a second field of touch fastener elements to a back side of the object. A first field of touch fastener elements is releasably engaged with the second field of touch fastener elements. One of the first and second touch fastener element fields includes an array of male touch fastener elements, each extending from a common base. The other of the first and second touch fastener element fields includes a multiplicity of fibers distributed over an area and engageable by the male touch fastener elements. The object is hung on the vertical surface by securing the first field of touch fastener elements to the vertical surface.

In the first and second aspects, a significant majority of the male touch fastener elements are oriented to overhang the base in a single, common direction, each male touch fastener element of the significant majority extending from the base to a distal tip. As used herein, "a significant majority" may range, for example, from at least 75 percent of the male touch fastener elements to essentially all of the male touch fastener elements. In some examples, at least 90 percent or at least 95 percent of the male touch fastener elements are oriented to overhang the base in a single, common direction. The orientation of the significant majority of the male touch fastener elements is such that, with the object hanging on the vertical surface, the fastener elements of the significant majority bear the weight of the object in a downward direction and such that the significant majority of the male touch fastener elements are oriented so as to not inhibit lifting of the object in an upward direction.

In some implementations, the second field of touch fastener elements includes the array of male touch fastener elements. The back side of the object can be flat in an area where the second field of touch fastener elements is secured. The vertical surface on which the object is hung, a region of the back side of the object where the second field of touch fastener elements is secured, or both may be rigid. Securing the second field of touch fastener elements to the back side of the object can include securing multiple, spaced-apart patches to the back side of the object, each patch carrying a portion of the second field of touch fastener elements. In some cases, the patches are spaced apart horizontally on the back side of the object in the selected orientation with respect to the vertical surface. After hanging the object on the vertical surface, an angular orientation of the object on the vertical surface may be altered by sliding one lateral side of the object upward along the vertical surface, with respect to an opposite lateral side of the object.

In various other aspects, a releasable hanging system includes a loop fastener component and a hook fastener component. The loop fastener component includes a flexible patch carrying a field of engageable fibers exposed on a front side of the patch and an adhesive on a back side of the patch. The hook fastener component includes a resin base carrying an array of male touch fastener elements, a significant majority of the male touch fastener elements each extending from the base to a distal tip, to overhang the base in a single, common direction.

In one of the various aspects, the hook fastener component includes a visible indication, other than the orientation of the male touch fastener elements themselves, of the common direction in which the significant majority of the male touch fastener elements overhang the base or a direction opposite the common direction in which the significant majority of the male touch fastener elements overhang the base.

In another one of the various aspects, the hook and loop fastener components are configured to engage each other to form a releasable fastening having an overall engaged thickness of less than about 0.5 millimeters, and an engaged shear slack of less than 10 percent of the overall engaged thickness.

In another one of the various aspects, the hook and loop fastener components are configured to engage each other to form a releasable fastening having an initial shear resistance, loaded in opposition to the common direction of the significant majority of the male touch fastener elements, that is more than 10 times an initial shear resistance of the releasable fastening loaded in the common direction of the significant majority of the male touch fastener elements.

In yet another one of the various aspects, the hook and loop fastener components are configured to provide a peel force of at least 0.1 pound per inch of closure width when peeled in opposition to the common direction of the significant majority of the male touch fastener elements.

In some implementations of aspects of the subject matter, the significant majority of male touch fastener elements comprises at least 75 percent of the male touch fastener elements. In certain implementations, the significant majority of male touch fastener elements comprises essentially all of the male touch fastener elements. The male touch fastener elements have stems extending contiguously from the resin base, so as to together form one contiguous resin mass. The male touch fastener elements can be arrayed in rows and columns, each row and column comprising multiple male touch fastener elements. The density of the male touch fastener elements is preferably at least 350 male touch fastener elements per square inch of the resin base. For many applications, some or most of the male touch fastener elements of the significant majority have non-reentrant tips, meaning that the tips do not extend back toward the base. Rather, the tips are substantially parallel to, or are directed away from, an upper surface of the base from which the male touch fastener element extends.

In some implementations, the visible indication of the single, common direction in which the significant majority of the male touch fastener elements overhang the base (or a direction opposite the common direction in which the significant majority of the male touch fastener elements overhang the base) is an overall shape of the hook fastener component. Alternatively, or in addition, the visible indication includes a graphic printed on the hook fastener component. In some cases, the hook fastener component includes an adhesive on the back side of the hook fastener component, a release liner covering the adhesive, and a visible indication provided (e.g., printed) on the release liner. The adhesive on the back side of the loop fastener component, the back side of the hook fastener component, or both may be a pressure-sensitive adhesive.

The various inventive aspects described above can be combined for particular advantage in different embodiments. Additionally, embodiments may be provided with other features. In one example, a releasable hanging system may include instructions for adhering a first one of the fastener components to the object, adhering a second one of the fastener components to a surface from which to hang the object, engaging the loop fastener component and the hook fastener component, and adjusting an orientation of the object with respect to the surface. In another example, a releasable hanging system includes instructions for removing the first one of the fastener components from the object, for removing the second one of the fastener components from the surface, or for a combination thereof.

Advantages of certain combinations of embodiments described herein include the ability to adjust the orientation of an object with respect to a vertical surface without repositioning the fastener component adhered to the wall and without repositioning the fastener component adhered to the object. Other advantages of certain combinations of embodiments described herein include releaseability of the fastener components from the vertical surface and from the object without damaging the finish of the vertical surface or the object.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 11 depicts a side view of a portion of a laminate hook fastener component of a releasable hanging system.

FIGS. 12A-12C depict hook fastener components with examples of a visible indication of a direction opposite the common direction in which the significant majority of the male touch fastener elements overhang the base of the hook fastener component.

Like reference symbols in the various drawings indicate like elements.

DETAILED DESCRIPTION

Figure 1:
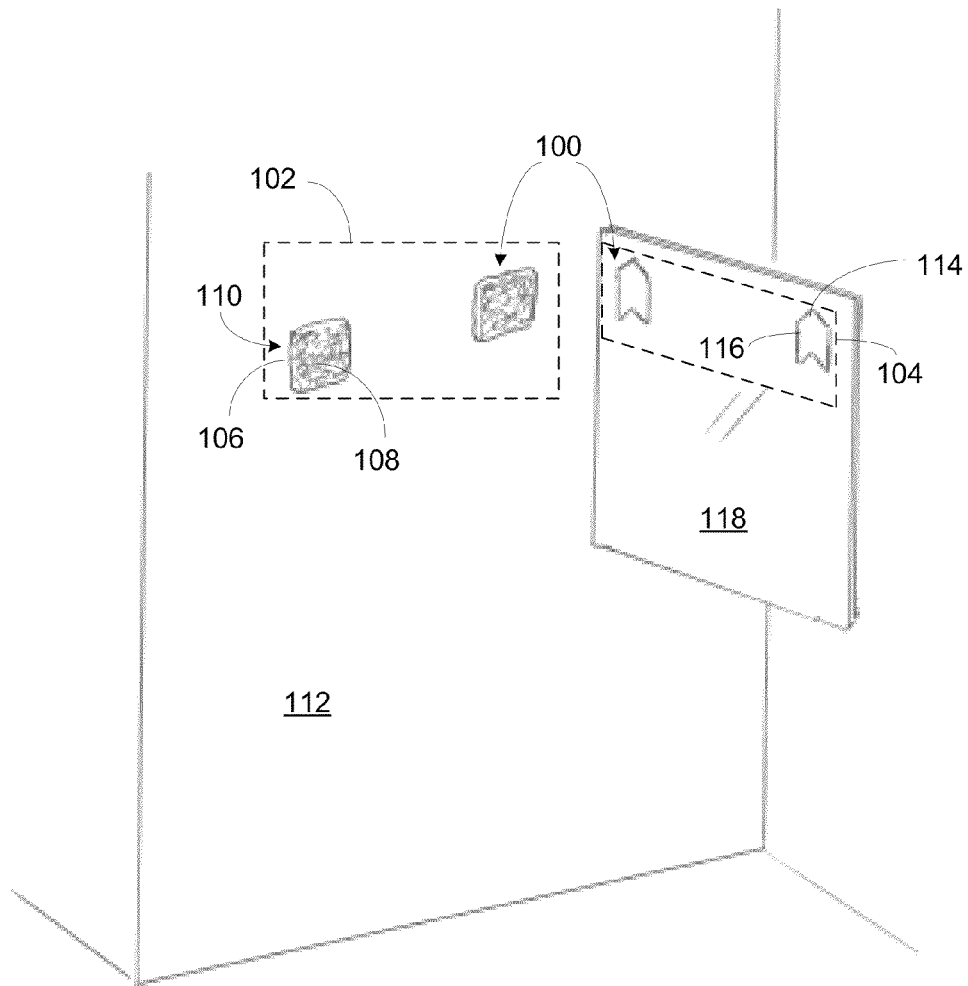
FIG. 1 is an illustration of components of a releasable hanging system used to releasably hang an object on a vertical surface.

Releasably hanging an object on a vertical surface may include selecting a vertical surface having a first field of touch fastener elements, selecting a desired orientation of an object with respect to the vertical surface, securing a second field of touch fastener elements to a back side of the object, and hanging the object on the vertical surface by releasably engaging the first and second fields of touch fastener elements. In some implementations, releasably hanging an object on a vertical surface includes selecting a vertical surface, selecting a desired orientation of an object with respect to the vertical surface, securing a first field of touch fastener elements to the vertical surface, securing a second field of touch fastener elements to a back side of the object, and hanging the object on the vertical surface by releasably engaging the first and second fields of touch fastener elements. In other implementations, releasably hanging an object on a vertical surface includes selecting a vertical surface, selecting a desired orientation of an object with respect to the vertical surface, securing a second field of touch fastener elements to a back side of the object, releasably engaging a first field of touch fastener elements with the second field of touch fastener elements, and hanging the object on the vertical surface by securing the first field of touch fastener elements to the vertical surface.

One or both of the vertical surface on which the object is hung and a region of the back side of the object where the second field of touch fastener elements is secured can be rigid. In some cases, the vertical surface is a wall. The object to be hung on the vertical surface may be, for example, a picture frame, a decorative wall tile, or other rigid object. The back side of the object may be flat in an area where the second field of touch fastener elements is secured.

One of the first and second touch fastener element fields includes a hook fastener component, with an array of male touch fastener elements each extending from a common base. A significant majority of the male touch fastener elements are oriented to overhang the base in a single, common direction. Each male touch fastener element of the significant majority extends from the base to a distal tip. Some or all of the distal tips can be non-reentrant tips. The orientation of the significant majority of the male touch fastener elements is such that, with the object hanging on the vertical surface, the fastener elements of the significant majority bear the weight of the object in a downward direction and such that the significant majority of the male touch fastener elements are oriented so as to not inhibit lifting of the object in an upward direction. The other of the first and second touch fastener element fields includes a loop fastener component, with a multiplicity of fibers or loop fastener elements distributed over an area and engageable by the male touch fastener elements.

In some cases, the first field of touch fastener elements includes male touch fastener elements and the second field of touch fastener elements includes loop fastener elements. The first field of touch fastener elements is secured to the vertical surface such that a significant majority of the male touch fastener elements are oriented to overhang the base in an upward direction with respect to the vertical surface. In other cases, the first field of touch fastener elements includes loop fastener elements, and the second field of touch fastener elements includes male touch fastener elements. The second field of touch fastener elements is secured to a back side of the object such that a significant majority of the male touch fastener elements are oriented to overhang the base in an downward direction with respect to the vertical surface. In one example, the first field of touch fastener elements is a loop fastener surface, with an area of loop material that exceeds the dimensions of the back side of the object. For example, the vertical surface may be a display board, wall panel, bulletin board, or room partition with a surface including a loop material releasably engageable by a field of male touch fastener elements secured to the back side of an object.

In one implementation, FIG. 1 depicts components of releasable hanging system 100 configured to releasably hang an object from a vertical surface. Releasable hanging system 100 includes a first field of touch fastener elements 102 and a second field of touch fastener elements 104. The first field of touch fastener elements 102 includes one or more loop fastener components 106. Loop fastener components 106 includes an exposed field of engageable fibers or loop fastener elements 108 carried on a front side of a flexible patch 110, with an adhesive on the back side of the patch for securing the loop fastener component to a vertical surface 112. Multiple loop fastener components 106 can be spaced apart (e.g., horizontally and/or vertically) on the vertical surface 112 to form the first field of touch fastener elements 102.

Figure 3:
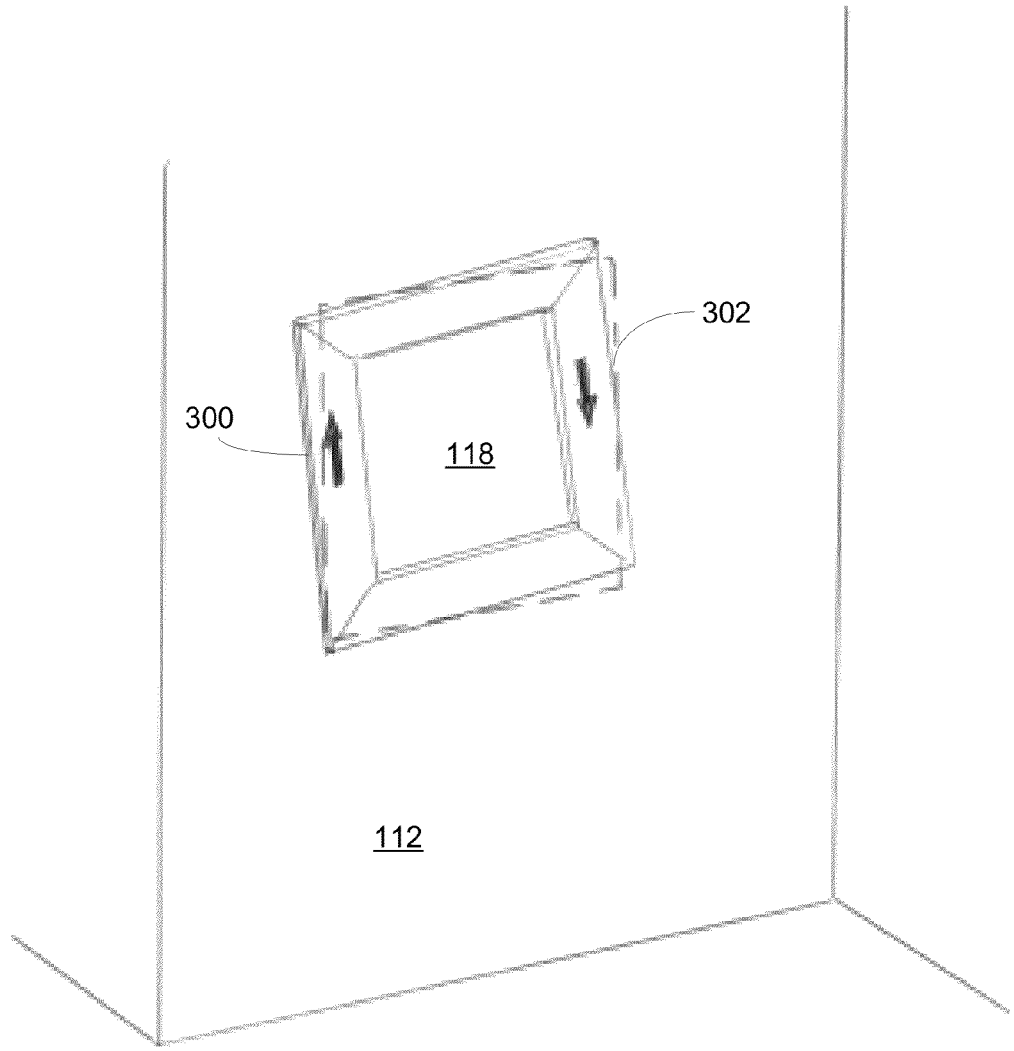
FIG. 3 depicts adjustment of an orientation of the object shown in FIG. 1 with respect to the vertical surface.

The second field of touch fastener elements 104 includes one or more hook fastener components 114. Hook fastener components 114 include an array of male touch fastener elements 116 and an adhesive on a back side of the hook fastener component for securing the hook fastener component to an object 118 to be hung from the vertical surface 112. Multiple hook fastener components 114 can be spaced apart (e.g., horizontally and/or vertically) on the back side of the object 118. In an example, multiple hook fastener components 114 are spaced horizontally apart on the back side of the object 118 in a selected orientation with respect to the vertical surface 112. To releasably hang object 118 from vertical surface 112, male touch fastener elements 116 on hook fastener components 114 are releasably engaged with loop fastener elements 108 on loop fastener components 106. With object 118 hung on vertical surface 112, as shown in FIG. 3, the male touch fastener elements 116 of the significant majority overhanging the base in a single, common direction (i.e., downward with respect to the vertical surface 112) bear the weight of the object 118 in a downward direction.

Figure 2:
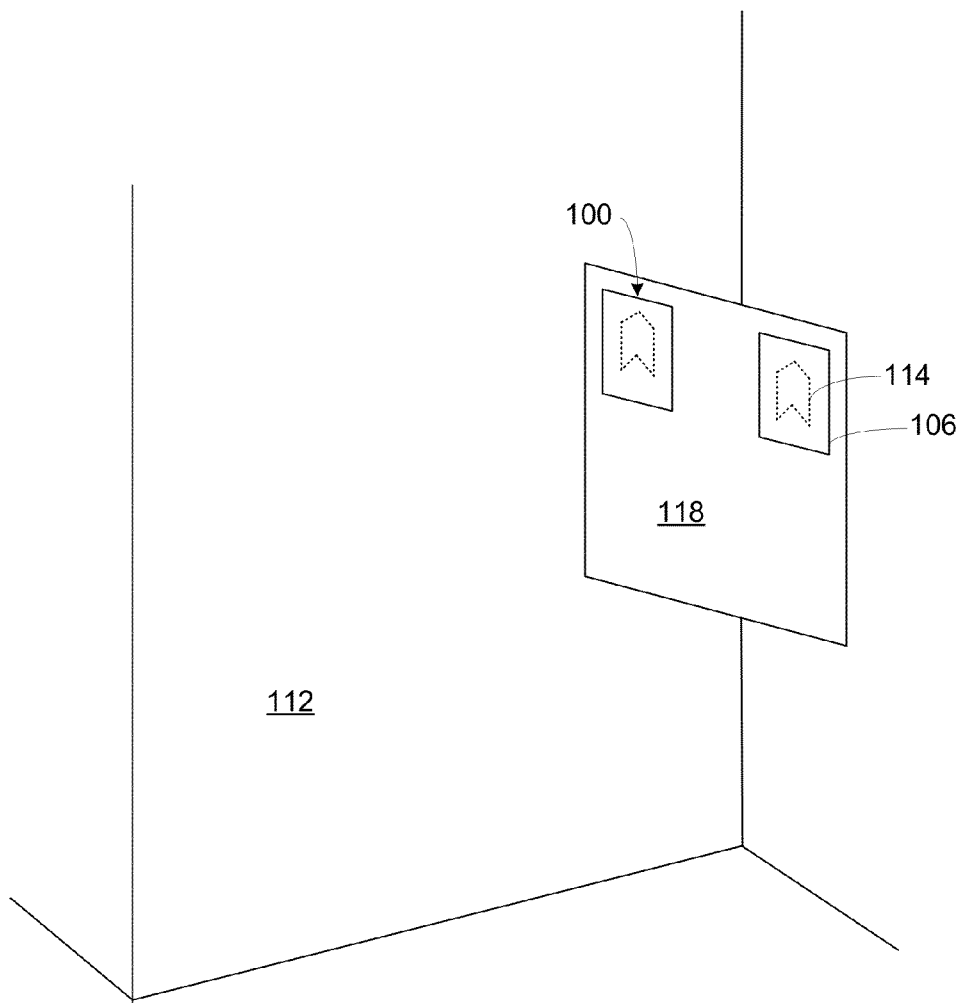
FIG. 2 is an illustration of components of a releasable hanging system used to releasably hang an object on a vertical surface.

In another implementation, FIG. 2 depicts hook fastener components 114 secured to object 118 and releasably engaged with loop fastener components 106. To releasably hang object 118 from vertical surface 112, a desired location and orientation of the object with respect to the vertical surface is selected. The loop fastener components 106 are secured to the vertical surface 112 with an adhesive on the back side of the loop fastener components by pressing the object 118 against the vertical surface. Securing the loop fastener components 106 to the vertical surface 112 releasably hangs the object 118 from the vertical surface.

With the object 118 releasably hung from the vertical surface 112, a significant majority of the male touch fastener elements is oriented so as to not inhibit lifting of the object in an upward direction. As indicated by the arrows in FIG. 3, an orientation of object 118 may be adjusted with respect to the vertical surface 112. Adjusting an orientation of object 118 with respect to vertical surface 112 can include sliding one lateral side 300 of the object upward along the vertical surface with respect to an opposite lateral side 302 of the object to alter an angular orientation of the object on the vertical surface.

Figure 4A:
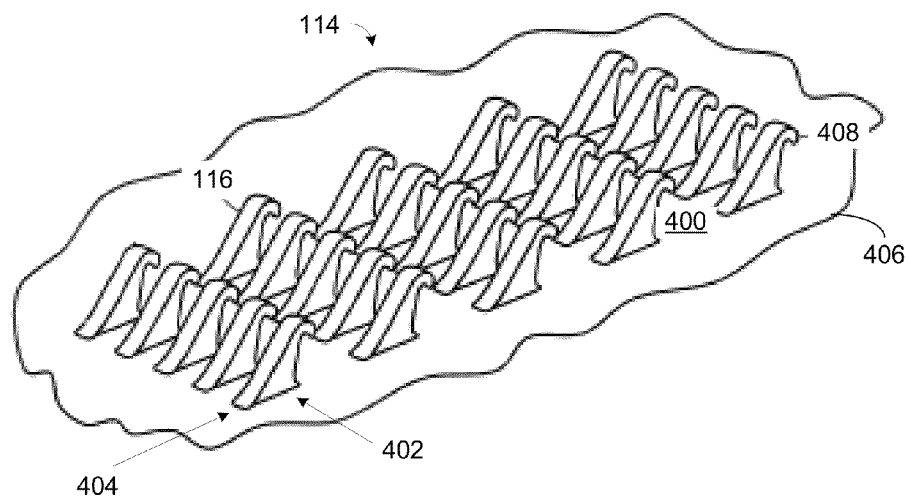
FIGS. 4A and 4B depict arrays of male touch fastener elements for use in hook fastener components of a releasable hanging system.
Figure 4B:
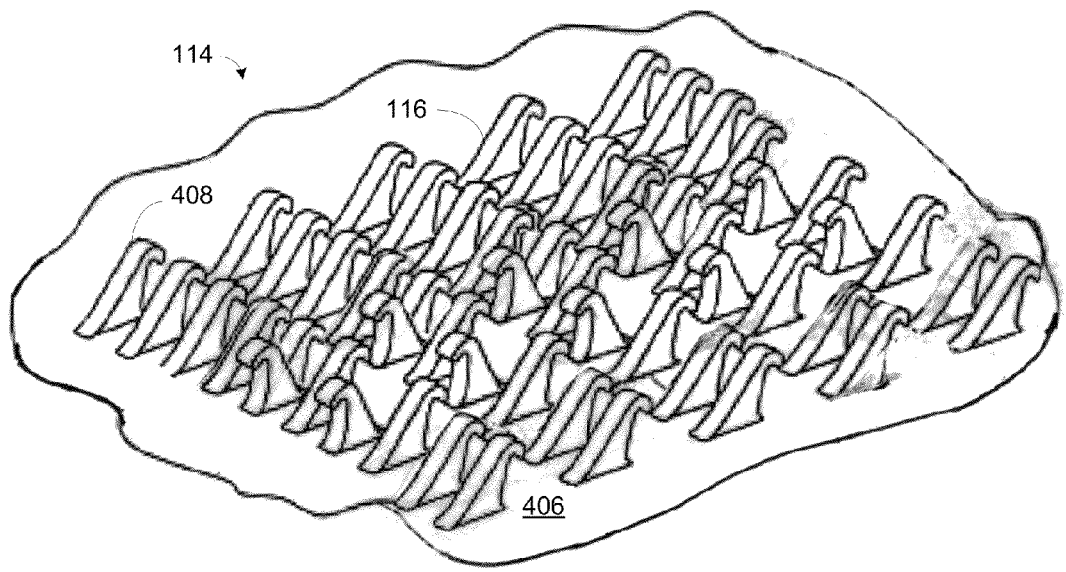

Referring to FIG. 4A, a top portion of a hook fastener component 114 of a releasable hanging system 100 includes an array 400 of male touch fastener elements 116 arranged in rows 402 and columns 404 extending outwardly from a sheet-form base 406, and together forming with the base a contiguous mass of resin. The male touch fastener elements 116 are arranged with a density of at least 350 male touch fastener elements per square inch of the resin base. A significant majority of the male touch fastener elements 116 are oriented to overhang the base 406 in a single, common direction, each male touch fastener element extending from the base to a distal tip 408. Some or all of the tips 408 are non-reentrant tips. FIG. 4A shows an array of male touch fastener elements 116 with essentially all of the male touch fastener elements oriented to overhang the base 406 in a single, common direction. FIG. 4B shows an array of male touch fastener elements 116 with some of the male touch fastener elements 116 oriented to overhang the base 406 in a direction opposite that of the significant majority of the male touch fastener elements.

Figure 5A:
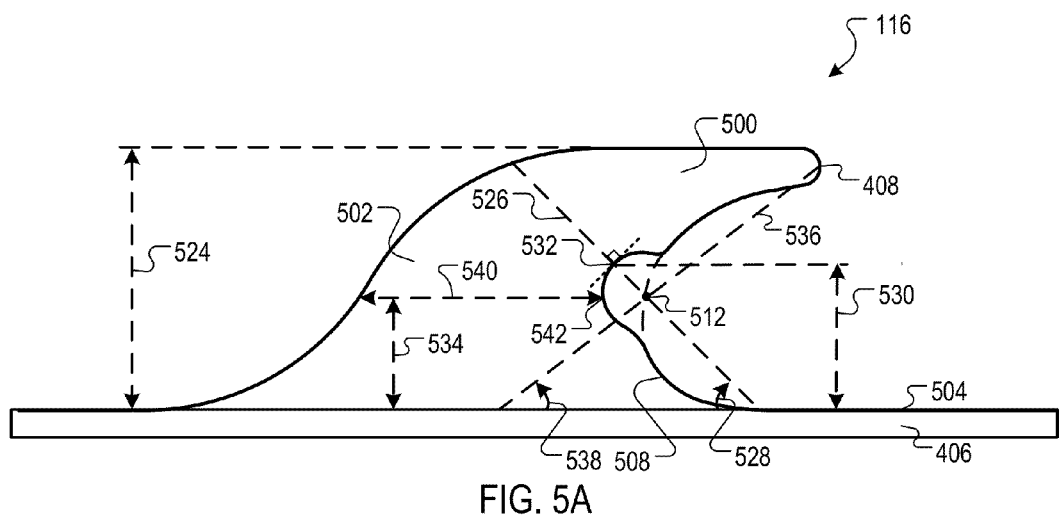
FIGS. 5A-5C show details of a male touch fastener element with a non-reentrant tip.

U.S. Patent Application Ser. No. 61/328,257 filed Apr. 27, 2010 and entitled "Male Touch Fastener Element," which is hereby incorporated in full by reference, describes male touch fastener elements suitable for use in releasable hanging systems. As shown in FIG. 5A, male touch fastener element 116 includes a head 500 having a tip 408 and extending from a stem 502. Tip 408 is a non-reentrant tip. Male touch fastener elements 116 are engageable in two directions along a plane (i.e., an engagement plane) parallel to sheet-form base 406 in the direction of columns 404 (FIG. 4A).

Figure 5B:
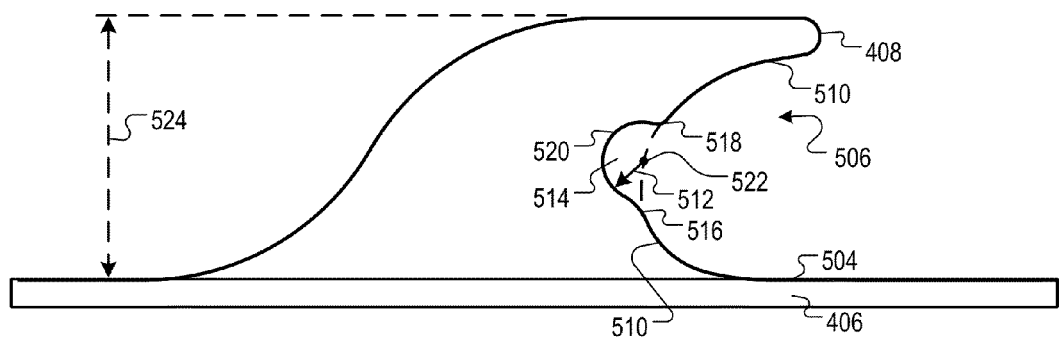
Figure 5C:
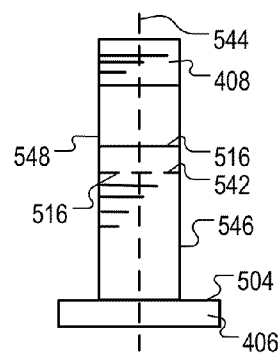

Referring now to FIGS. 5A, 5B, and 5C, male touch fastener element 116 has a substantially constant thickness from base to tip, and includes a stem 502 rising from a base 406, and a head 500 overhanging the base from a front side 506 of stem 502 to a distal edge at tip 408. A generally curved retention space boundary surface 508 is formed, in side profile, by front side 506 of stem 502, an underside 510 of head 500, and an upper surface 504 of base 406. Boundary surface 508 forms, at its innermost extent 512, a retention cavity 514 defined between curvature discontinuities 516, 518 spaced from both base 406 and distal tip 408.

Figure 6:
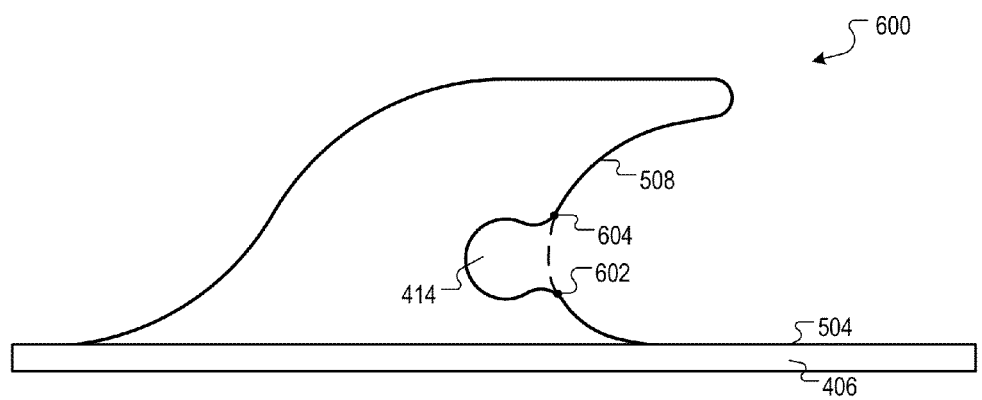
FIG. 6 shows details of a male touch fastener element with a non-reentrant tip.
Figure 7:
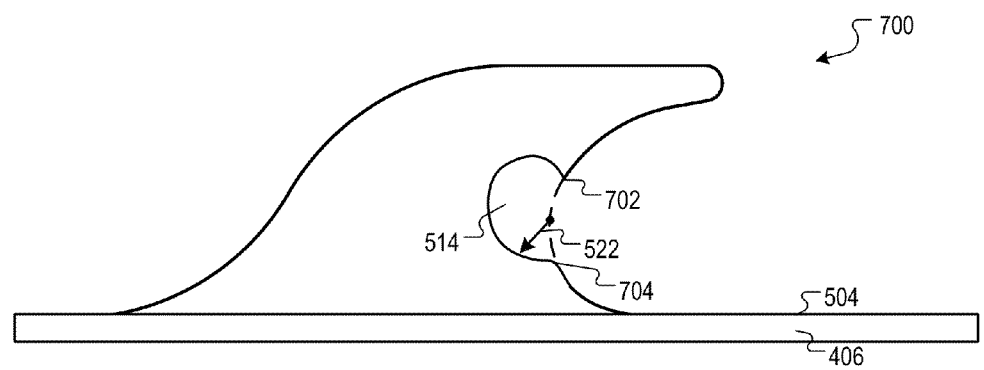
FIG. 7 shows details of a male touch fastener element with a non-reentrant tip.

In various implementations, curvature discontinuities 516, 518 are of a single type. For example, FIG. 6 illustrates an alternative implementation of a male touch fastener element 600 in which the curvature discontinuities include inflection points 602, 604 at which boundary surface 508 changes from being concave upwards (i.e., positive curvature) to concave downwards (i.e., negative curvature), and vice versa. In contrast, FIG. 7 illustrates an implementation of a fastener element 700 in which the curvature discontinuities are different and include a sharp corner 702 and rounded corner 704. As illustrated in FIGS. 6 and 7, some implementations include a deeper and/or lower retention cavity 514. These and other characteristics vary between implementations to achieve varying degrees of performance with respect to peel resistance and/or to mitigate loop breakage.

Referring again to FIG. 5B, retention cavity 514 is bound by a concave cavity wall 520. Concave cavity wall 520 defines a constant curvature radius 522. In particular, some examples include a constant curvature radius 522 of less than 20 percent of an overall height 524 of male touch fastener element 116 above upper surface 504 of base 406. In other examples, curvature radius 522 varies (i.e., the distance as measured in side profile from inner most extent 512 of boundary surface 508 to concave cavity wall 522). For example, as illustrated in FIG. 7, a variable curvature radius 522, as measured in side profile, increases from corner 704 to corner 702. In each of the examples, the curvature radius is preferably between about 0.001 and 0.003 inch.

The height, depth, and size of retention cavity 514 and overall dimensions of male touch fastener element 116 are molded to achieve a desired peel thickness, stem thickness, and/or to achieve a desired ratio of these parameters to the overall dimensions of the male touch fastener element. Other details of this fastener element design can be found in U.S. Patent Application Ser. No. 61/328,257.

By "peel thickness" we mean the thickness of male touch fastener element 116 as measured in side profile along a line 45 degrees to the upper surface of the base and extending from the front side of the stem to the back of the head, such that the line is normal to the front side of the stem at a point of intersection. For example, in FIG. 5A, line 526 forms a 45 degree angle 528 to upper surface 504 of base 406 and extends from front side 506 of stem 502 to the back of head 500 such that line 526 is normal to the front side of stem 502 at a point of intersection 530. The point of intersection in FIG. 5A is within retention cavity 514. In some implementations without a retention cavity, the point of intersection occurs at a point along boundary surface 508.

Each male touch fastener element 116 has a ratio of peel thickness to an elevation 530 of point of intersection 532 (measured from upper surface 504 of base 406) that is greater than 0.75, and preferably greater than 0.85. Further, in some examples, innermost extent 512 of boundary surface 508 is disposed at an elevation 530 above upper surface 504 of base 406 such that elevation 534 is less than half of the overall height 524 of fastener element 116 above the upper surface 504 of the base 406. Still further, in some embodiments, head 500 is molded such that innermost extent 512 of boundary surface 508 and a forward-most portion of distal tip 408 form a line 536 extending at an angle 538 having a value of between about 20 and 40 degrees to base 406, and preferably 30 degrees.

Male touch fastener element 116 includes a stem thickness 540, measured parallel to base 406 at a region of innermost extent 542 in a vertical plane 544 intersecting boundary surface 508, that is at least twice an elevation 534 of the region of innermost extent above the upper surface 504 of the base 406. When distal tip 408 is directed along the row 404 of male touch fastener element 116, stem 502 has a thickness 540 that is at least 1.7 times an elevation 534 of the region of innermost extent 542 above the upper surface 504 of the base 406.

Figure 8A:
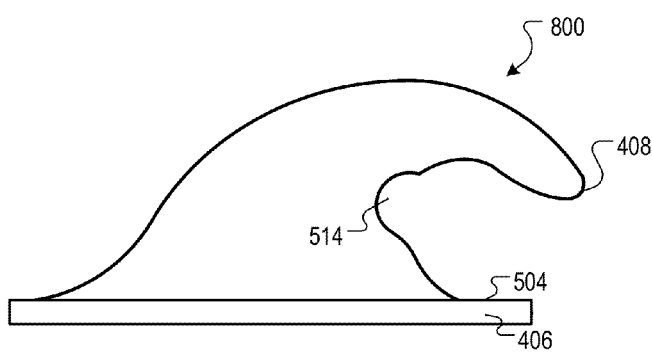
FIGS. 8A-8B show details of a male touch fastener element with a reentrant tip.
Figure 8B:
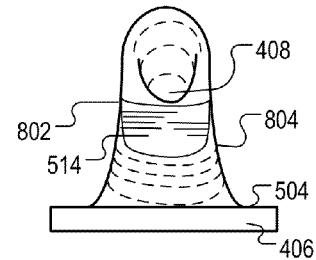

For some applications, the aspects described herein are combined with male touch fastener elements of different shapes, such as J-hooks and palm trees. FIGS. 8A and 8B illustrate a J-hook fastener 800 including a tapered, reentrant tip 408, a retention cavity 514, and generally curved sides 802, 804.

Figure 9:
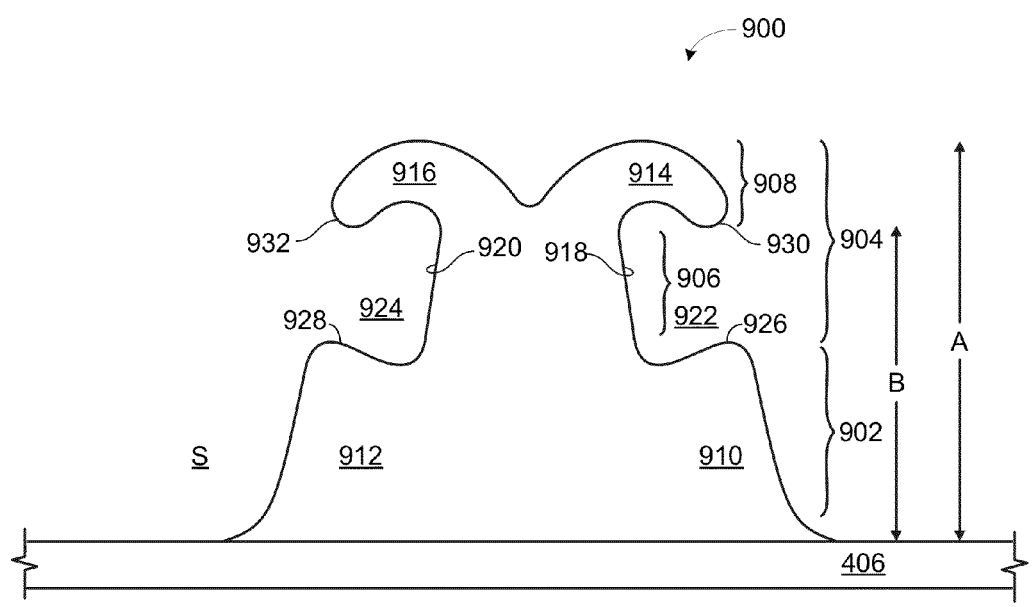
FIG. 9 shows details of a male touch fastener element with two reentrant tips facing in opposite directions.

FIG. 9 illustrates a palm tree fastener element 900 extending from base 406. Numerous individual, raised portions 902 rise from base 406. In this embodiment, each individual raised portion 902, at its upper, central region supports an individual male touch fastener element 904. The upper surface of base 406 lies distance A below the top of the male fastener elements 904, defining the loop space S in which loops may reside. Male touch fastener element 904 includes stem 906 and head 908. Raised portion 902 includes base portions 910, 912 that extend, respectively, in opposite lateral directions beyond the stem 902. The head 908 includes two head portions 914, 916 that project laterally in opposite directions, overhanging oppositely directed sides 918 and 920 of the stem 906 and defining loop regions 922 and 924 above the upper surfaces 926 and 928 of the base portions 910 and 912. Each loop region 922, 924, thus has a substantially raised lower bound which improves the probability that loops entering under the overhanging head portions will be engaged by the tips 930 and 932 of the head. Furthermore, the relative shortness of the stem 906 in comparison to the elevation A of the head 908 (or elevation B of the head tips 930, 932) enables the fastener elements to have desirable lateral bending resistance both in the plane in which the tips lie and in the orthogonal plane. Additional details regarding palm tree male touch fastener 900 are found in U.S. Pat. No. 7,516,524 to Provost et al., which is hereby incorporated in full by reference.

Figure 10:
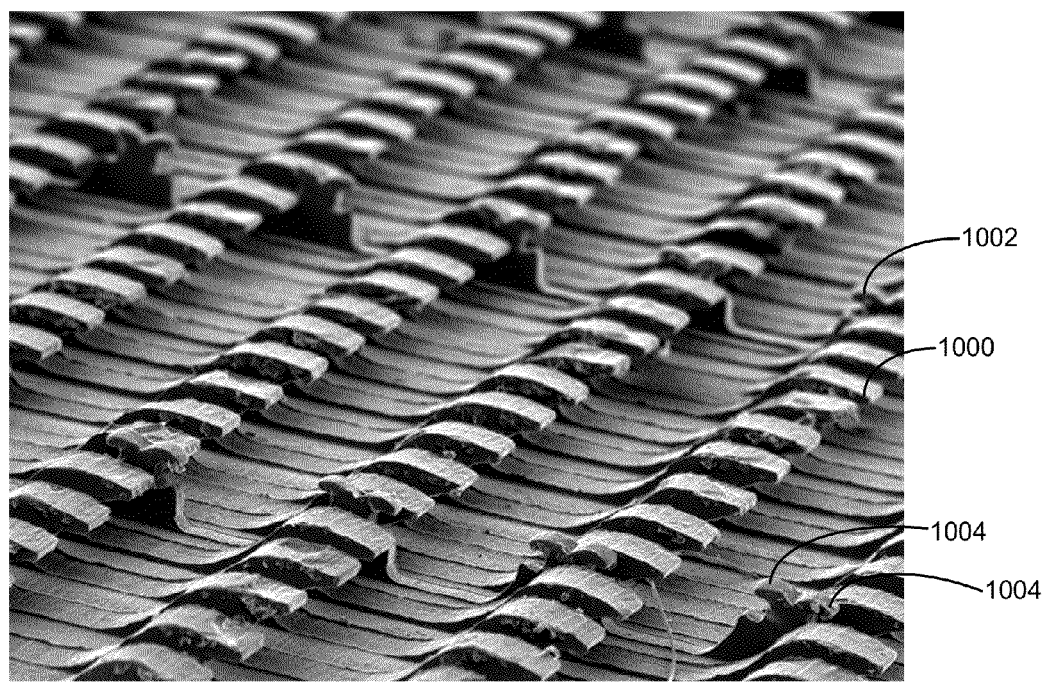
FIG. 10 is an SEM image of an array of male touch fastener elements on a hook fastener component of a releasable hanging system.

FIG. 10 is an SEM image of an array of male touch fastener elements including a significant majority of non-reentrant male touch fastener elements 1000 and palm tree male touch fastener elements 1002. As seen in FIG. 10, each palm tree male fastener element 1002 has two reentrant tips 1004, with one of the tips overhanging the base in the same direction as the non-reentrant tips of male touch fastener elements 1000 and one of the tips overhanging the base in the opposite direction as the non-reentrant male touch fastener elements.

A percentage of male touch fastener elements that overhang the base in a single, common direction can be calculated as follows. In one example, a statistically representative portion of an array of male touch fastener elements similar to that shown in FIG. 10 has 100 non-reentrant male touch fastener elements and 10 palm tree male touch fastener elements. As shown in FIG. 10, essentially all of the non-reentrant male touch fastener elements overhang the base in a single, common direction. The palm tree male touch fastener elements overhang the base in two directions: the direction of the significant majority (i.e., the direction of the non-reentrant male touch fastener elements 1000) and the direction opposite the significant majority. The percentage of male touch fastener tips overhanging the base in the direction of the significant majority is (100+10)/(100+20) or about 92 percent. In another example, an array of male touch fastener elements includes 88.8 percent unidirectional male touch fastener elements with non-reentrant tips with a density of 1713 elements per square inch, and 11.2 percent palm tree male touch fastener elements with a density of 216 palm tree male touch fastener elements per square inch, for a total of 1929 male touch fastener elements per square inch. The total number of tips per square inch is 1713+2(216)=2145, with 89.9 percent of the tips facing in one direction and 10.1 percent of the tips facing in the opposite direction.

The male touch fastener elements of FIGS. 4A-10 can be molded into the shapes shown using one or more techniques. For example, in a molding technique, a thermoplastic resin is extruded as a molten sheet from the extruder and introduced into a nip formed between a pressure roll and a counter-rotating defining fastener element-shaped cavities in its surface. Pressure in the nip causes thermoplastic resin to enter blind-ended forming cavities to form the fastener elements, while excess resin remains about the periphery of the mold roll and is molded between the rolls to form sheet-form base. The thermoplastic resin is cooled as it proceeds along the periphery of the mold roll, solidifying the fastener elements, until it is stripped by a stripper roll. The molded fastener elements distend during de-molding, but tend to recover substantially their as-molded shape. Further details regarding processing are described by U.S. Pat. No. 4,775,310 to Fischer and U.S. Pat. No. 6,802,260 to Clune et al., the disclosures of which are hereby incorporated in full by reference.

In some embodiments, the mold roll includes a face-to-face assembly of thin, circular plates or rings that are, for example, about 0.003 inch to about 0.250 inch (0.0762 mm-6.35 mm) thick, some having cutouts in their periphery defining mold cavities and others having solid circumferences, serving to close the open sides of the mold cavities and serve as spacers, defining the spacing between adjacent fastener element rows. A fully "built up" mold roll may have a width, for example, from about 0.75 inch to about 6 inches (1.91 cm-15.24 cm) or more and may contain, for example, from about 50 to 1000 or more individual rings. Further details regarding mold tooling are described by U.S. Pat. No. 4,775,310 to Fischer.

The cavities that made the male touch fastener elements shown in FIGS. 5A-7 have sharp edges and straight sidewalls (e.g., see sidewalls 546, 548 shown in FIG. 5C) and create fastener elements with substantially similar cross-sections through the thickness of the fastener element. Tooling with straight sidewalls and edges can be made by, for example, laser cutting, wire EDM or electroforming. Further details regarding laser cutting and wire EDM mold tooling is described by U.S. Pat. No. 4,775,310 to Fischer. The electroforming process is described by U.S. Pat. No. 7,052,638 to Clarner et al., the disclosure of which is hereby incorporated in full by reference.

By contrast, male touch fastener elements formed in cavities that have been, for example, photochemically etched may have rounded surfaces in some or all regions, from base to tip, such as the fasteners illustrated in FIGS. 8A and 8B. For example, surfaces at the top of the heads can be made to taper to a point to give a wedge effect. A wedge-shape may, for example, assist the entry of the crook into the face of a mating loop fastener component. Further details regarding photochemical etching is described in U.S. Pat. No. 6,163,939 to Lacey et al., the entire disclosure of which is hereby incorporated in full by reference.

An alternate technique for molding fastener elements is similar to that described above, except only a mold roll is used, i.e., no pressure roll is necessary. Here, the extruder is shaped to conform to the periphery of the mold roll and the extruded resin is introduced under pressure directly to a gap formed between the mold roll and the extruder. The molded fastener component is stripped from the mold cavities by a stripper roll as described above. Further details regarding this process are described by U.S. Pat. Nos. 5,781,969 and 5,913,482 to Akeno, the disclosures of which are hereby incorporated in full by reference.

In some cases, the male touch fastener elements are not molded in their final form. In any of the methods disclosed above, for example, the hook fastener component may be routed through a subsequent processing station to finalize the form of the male touch fastener elements. Such subsequent processing may include "flat-topping" overhanging male touch fastener element pre-forms, as described by U.S. Pat. No. 5,953,797 to Provost and U.S. Pat. No. 5,781,969 to Akeno, the disclosure of both of which is hereby incorporated in full by reference. In some cases, even straight molded stems may be subsequently processed to result in fastener elements having the properties disclosed herein. Flat-sided fastener elements with the profiles shown in FIG. 5C can also be formed by a cut-and-stretch method, such as the method disclosed in U.S. Pat. No. 4,895,569 to Nestegard, for example, which is hereby incorporated in full by reference. In such processes, moldable resin is extruded through a die with openings shaped in the desired hook profile, then the extruded rails are cut transverse to the extrusion direction, and the base stretched in the extrusion direction to separate the rails into rows of discrete fastener elements. This procedure results in fastener elements with broad sides that are cut rather than molded, as in the processes described above, and with profile edges formed by sliding resin through a shaped die rather than a filling cavity.

FIG. 11 shows a side view of a portion of a hook fastener component 114 with male touch fastener elements 116 on a common base 406. As shown in FIG. 11, hook fastener component 114 is a laminate including a laminating adhesive 1100, a polyethylene terephthalate (PET) film 1102, a silicone pressure-sensitive adhesive 1104, and an optional release liner 1106 such as, for example, a protective fluoropolymer liner. In some implementations, a thickness of the laminating adhesive ranges from 0.002-0.004 inch (0.05-0.01 mm), a thickness of the PET film ranges from 0.001-0.002 inch (0.025-0.05 mm), a thickness of the silicone pressure-sensitive adhesive ranges from 0.0005-0.001 inch (0.013-0.025 mm), and a thickness of the release liner ranges from 0.001-0.002 inch (0.025-0.05 mil). One or more additional intervening layers may be present between the base 406 and the silicone pressure-sensitive adhesive 1104 or the base and the release liner 1106. The release liner 1106 is removed from the silicone pressure-sensitive adhesive 1104 before the hook fastener component 114 is secured to an object 118 with the pressure-sensitive adhesive.

As described with respect to FIG. 1, hook fastener component 114 is configured to be secured to object 118 with the significant majority of the male touch fastener elements 116 overhanging the base in a downward direction relative to the vertical surface 112, such that the male touch fastener elements of the significant majority overhanging the base in a single, common direction bear the weight of the object in a downward direction. In some implementations, hook fastener components include a visible indication, other than the orientation of the male touch fastener elements themselves, of the orientation in which the hook fastener component is to be secured to the object such that the significant majority of the tips of the male touch fastener elements overhang the base in a downward direction with respect to the vertical surface. Examples of such visible indications are shown in FIGS. 12A-12C.

For example, FIG. 12A illustrates a hook fastener component 114 with an overall shape indicative of the orientation in which the hook fastener component is to be secured to the object such that the male touch fastener elements 116 of the significant majority overhanging the base 406 in a single, common direction bear the weight of an object releasably hung from a vertical surface in a downward direction. FIG. 12B shows a hook fastener component 114 with a graphic indication 1200 of the intended orientation of the hook fastener component with respect to vertical surface 112. The graphic indication 1200 is visible on the hook side of the hook fastener component 114 and indicates an intended orientation of the hook fastener component with respect to the vertical surface 112. In some implementations, the graphic indication 1200 is printed on the hook side of the hook fastener component 114 with an inkjet process using a wax-based ink. Printers suitable for applying a wax-based ink to the hook surface of a hook fastener component are available, for example, from Markem Corporation (Keene, N.H.). FIG. 12C shows a perspective view of a hook fastener component 114 with graphic indication of the intended orientation of the hook fastener component relative to the vertical surface 112 printed on the adhesive side of the hook fastener component (e.g., on the adhesive side of the base 406, on the silicone pressure-sensitive adhesive layer 1104, or on the release liner 1106).

Hook fastener component 114 is designed to strongly engage a low pile height, loop touch fastener component, particularly a loop component with loops formed of knit or non-woven materials. Non-woven materials are described in U.S. Pat. No. 6,329,016 to Shepard, which is fully incorporated herein by reference. Non-woven loop materials are constructed, for instance, of a layer of fibers or filaments that have relatively raised or lofty loop regions between regions secured by adhesives or self-adhesive bonds. Loop 3905, from Velcro USA, Inc., is an example of a suitable knit loop material.

Figure 13:
FIG. 13 depicts a side view of a portion of a laminate loop fastener component of a releasable hanging system.

FIG. 13 shows a side view of a portion of a loop fastener component 106 of a releasable hanging system 100. Loop fastener component 106 is a flexible patch carrying a field of engageable fibers 108 exposed on a base layer 1300. As shown in FIG. 13, loop fastener component 106 is a laminate with a laminating adhesive 1100, a polyethylene terephthalate (PET) film 1102, a silicone pressure-sensitive adhesive 1104, and an optional release liner 1106 such as, for example, a protective fluoropolymer liner. Thicknesses of these layers are similar to thicknesses described for layers of the hook fastener components. In some implementations, one or more additional intervening layers may be present between the base 1300 and the silicone pressure-sensitive adhesive 1104 or between the base and the release liner 1106. The release liner 1106 is removed from the silicone pressure-sensitive adhesive 1104 before the loop fastener component 106 is secured to a vertical surface 112 with the pressure-sensitive adhesive.

Figure 14:
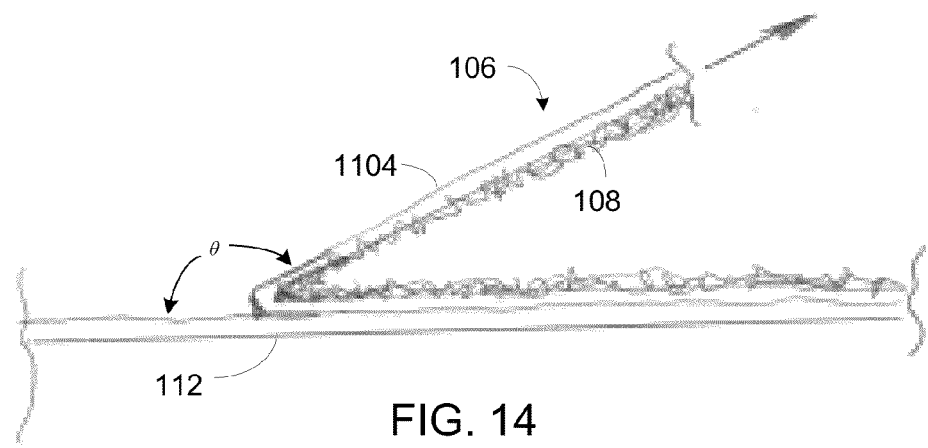
FIG. 14 illustrates removal of a loop fastener component from a surface.

Silicone pressure-sensitive adhesive layer 1104, combined with the flexibility of the separated fastener components, together enable hook fastener component 114 and loop fastener component 106 to be removed without damaging the surfaces to which they are adhered. For example, loop fastener component 106 can be removed from a painted or wallpapered wall without damaging the finish on the wall, by sharply peeling the loop fastener component back from one corner, so as to create a sharp bend in the component at the point of peel. Similarly, hook fastener component 114 can be removed from the back of a decorative wall tile or other object without damaging the object. As seen in FIG. 14, the flexible loop fastener component 106 may be peeled off of surface 112 by pulling one end of the loop fastener component at an obtuse angle θ with respect to the surface. When peeled at an angle θ of 170 degrees, for example, the loop fastener components forms a sharp corner at the point of peel, with an effective bend radius of less than about 0.025 inch (0.64 mm). In some releasable hanging systems, the bend radius of the hook fastener component exceeds the bend radius of the loop fastener component. In an example, a bend radius of a hook fastener component is about 0.04 in (1 mm).

Figure 15:
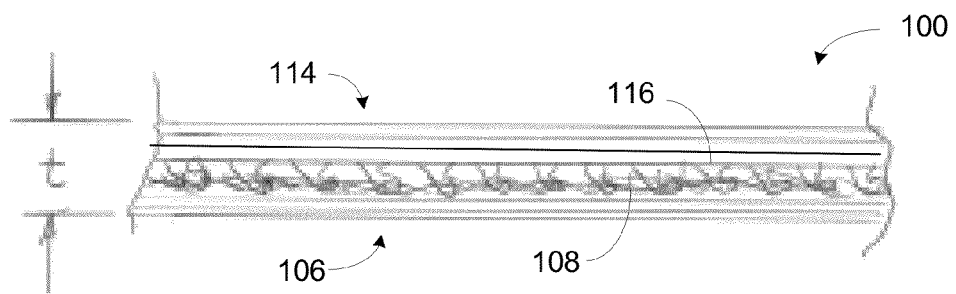
FIG. 15 is a side view of a portion of a loop fastener component of a releasable hanging system engaged with a hook fastener component of a releasable hanging system.

FIG. 15 illustrates a side view of a portion of a releasable hanging system 100 with loop fastener component 106 engaged with hook fastener component 114. "Engaged thickness" 't' is a measurement of the overall thickness of the engaged closure, prepared according to paragraphs 6.1 through 8.23 of ASTM D5170-98, and then engaged according to paragraph 8.24 of ASTM D5170-98, except that the roller is pushed across the closure in only one direction, for one pass, constituting one-half of a cycle. Engaged thickness is then measured with the closure in an unloaded state, such as by optical measurement viewing the closure from its longer edge. Thus, the thickness measurement is made following initial engagement under static load of one-half pound per square inch for two seconds and one rolling load of 11 pounds per inch of closure width.

For some applications, the releasable hanging system advantageously is configured to have an overall engaged thickness between about 0.3 mm and 0.7 mm. In one example, an overall engaged thickness for a releasable hanging system is 0.46 mm (with no release liners). This particularly low engaged thickness avoids unsightly large gaps between an object and the surface to which it is fastened, and also reduces tension forces in the hook-loop engagement caused by the overhang of the object weight. Instead, the vast majority of the weight of relatively planar objects, such as picture frames, with gravity centers close to the wall, is exerted as a shear force in the fastening system, rather than a tension force or a peel force.

Figure 16A:
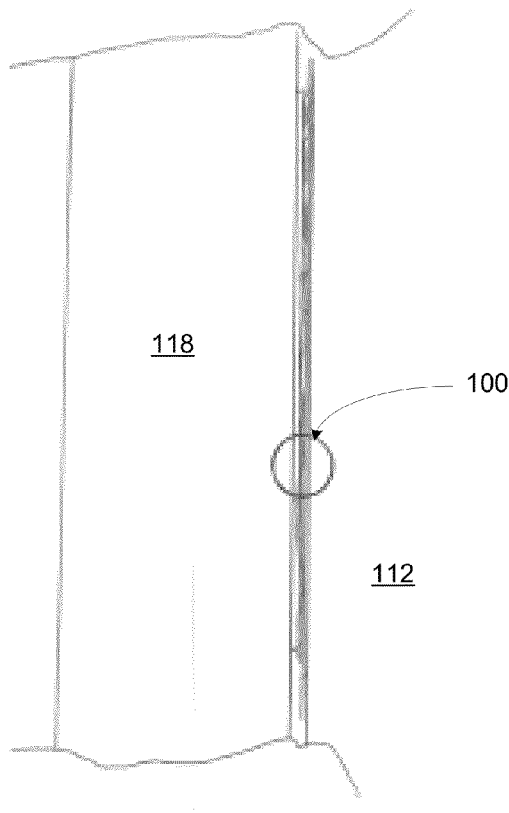
FIGS. 16A-16C are side views of a portion of a loop fastener component of a releasable hanging system engaged with a hook fastener component of a releasable hanging system to releasably hang an object from a vertical surface.
Figure 16B:
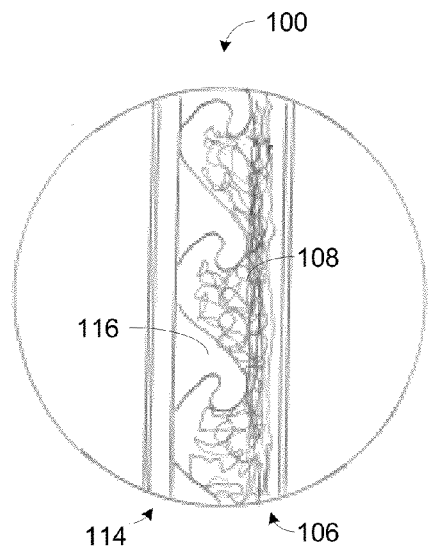
Figure 16C:
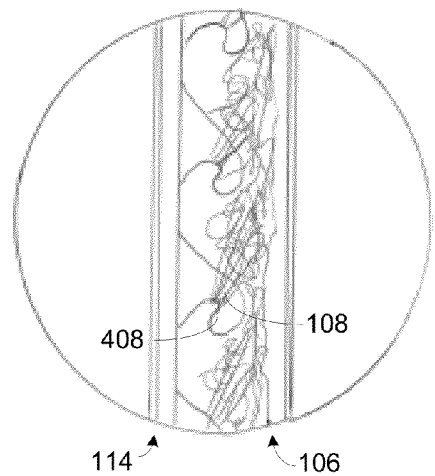

FIG. 16A depicts an object 118 releasably fastened to a vertical surface 112 with a releasable hanging system 100. FIGS. 16B and 16C show enlarged views of a portion of the engaged loop fastener component 106 and hook fastener component 114 of the releasable hanging system 100. As shown in FIG. 16B, when hook fastener component 114 initially contacts loop fastener component 106, male touch fastener elements 116 of the hook fastener component contact fibers 108 of the loop fastener component, with a significant majority of the male touch fastener elements oriented to overhang the base of the hook fastener component in a downward direction relative to the vertical surface 112. The orientation of the significant majority of the male touch fastener elements 114 is such that, with the object 118 hanging on the vertical surface 112, the male touch fastener elements 114 of the significant majority bear the weight of the object in a downward direction. The engagement of fibers 108 of the loop fastener component 106 by male touch fastener elements 116 of the hook fastener components 114 can be seen in FIG. 16C, for example, by the extension of fibers 108 about the distal, non-reentrant tip 408 of the male touch fastener elements.

The significant majority of the male touch fastener elements 116 are oriented so as to not inhibit lifting of the object 118 in an upward direction. This orientation of the significant majority of the male touch fastener elements 116 (or tips 408) allows the sliding of one lateral side 300 of the object 118 upward along the vertical surface 112, with respect to an opposite lateral side 302 of the object (depicted in FIG. 3) to alter angular orientation of the object on the vertical surface.

Because of the directional nature of the array of hook fastener elements, the hook and loop fastener components will tend to be separable by a much lower peel force when peeled in a direction opposed to the direction of the application of the weight of the hung object to the closure, than when peeled in a direction corresponding to the application of the weight. In one example, the fastening system was separable by a Peel Force of only 0.112 pounds per lineal inch of fastening width (2.00 kg/m) when engaged properly and removed in a peel fashion by pulling the loop fastener component in a direction opposed to the hook members, but when peeled in the opposite direction (i.e., toward the direction in which the majority of hook tips extend), the required peel force for separation was about 0.267 pounds per lineal inch (4.77 kg/m). Peel resistance, or the amount of peel force required for separation, of the engaged closure is determined in accordance with ASTM D5170-98, employing the integrator average option for calculation. This standard measure is understood to be generally related to the ability of the engaged fastener to resist peeling loads that are applied initially at one edge of the closure, and propagate across the closure as the two fastener components are separated by peeling.

For many applications, the hook and loop fastener components are preferably configured to engage each other to form a releasable fastening providing an initial shear resistance, as loaded in the common direction of the significant majority of the male touch fastener elements ("forward shear"), that is more than 10 times an initial shear resistance of the releasable fastening loaded in opposition to the common direction of the significant majority of the male touch fastener elements ("reverse shear"). "Initial shear resistance" of the engaged closure is determined in accordance with ASTM D5169-98. This standard measure is understood to be generally related to the ability of the engaged fastener to resist loads applied within the plane of the fastener, and this significant difference between the forward and reverse shear characteristics of the fastening is directly related to the ease of adjustment by sliding the fastened object upward along the vertical surface on which it is hung, for example.

Figure 17:
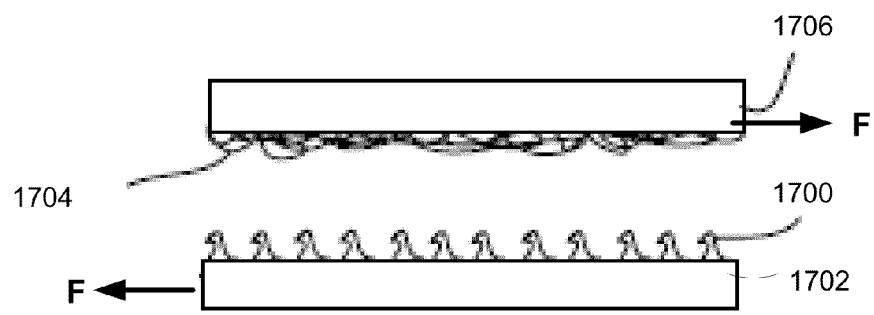
FIG. 17 illustrates relative movement of a substrate with loop fastener elements and a substrate with hook fastener elements during a process to assess engaged shear slack of the fastening system.

With reference to FIG. 17, to determine shear slack, as that phrase is used herein, hook material 1700 is laminated to a rigid substrate, such as, for example, an aluminum panel 1702 and is engaged with loop material 1704 laminated to a second rigid substrate 1706.

Figure 18:
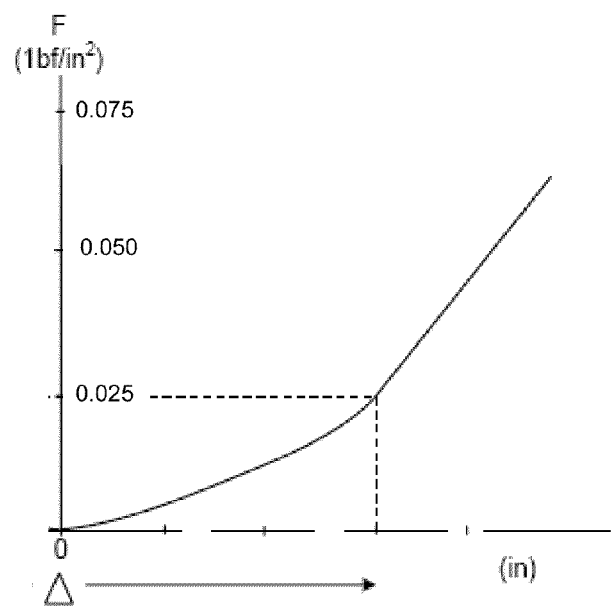
FIG. 18 depicts the range of movement of a loop fastener element during a process to assess engaged shear slack of a releasable hanging system.

Fastening sample sections are prepared with a one inch by one inch overlap (6.45 sq. cm). Substrate 1702 is then loaded in the direction shown by the arrows in FIG. 17, such that the hook elements engage the loop elements, at a pull rate of about 0.25 inch (6.3 mm) per minute using a programmable MTS tester until a shear load F of 0.025 pounds (11 grams) is obtained. Once the target shear load has been reached in this direction, shear slack is recorded as the displacement (or in-plane movement) $\Delta$ of substrate 1702 relative to substrate 1706 at the target load, as shown in FIG. 18.

Figure 19:
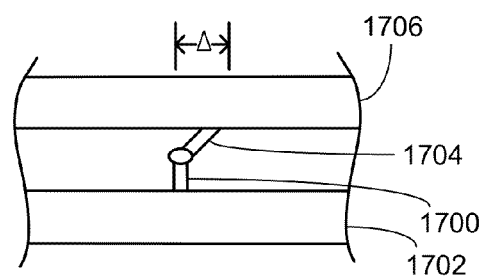
FIG. 19 illustrates displacement of hook and loop fastener components of a releasable hanging system over a range of shear loading.

As shown in FIG. 19, for fasteners with a significant majority of the male touch fastener elements oriented to overhang the base in a single, common direction, shear slack $\Delta$ is generally equal to the range of movement in the direction that embeds the male touch fastener elements in the loop elements. The position of loop 1704 shows the loop extension relative to male touch fastener element 1700. Thus, for such releasable hanging systems, shear slack is understood to be movement from initial engagement to the limit of travel in one particular direction. Measurement of the limit of travel of substrates 1702 and 1706 in the direction indicated in FIG. 17 (i.e., such that the male touch fastener elements engage loops as shown in FIG. 16C) at the predetermined load provides a measurement of shear slack $\Delta$. This shear slack measurement is related to the degree of 'sag' that a user would perceive in a hung object as it is initially released.

Preferably, the shear slack is approximately 0.001 inch (0.025 mm) to 0.005 inch (0.13 mm). It is also preferable that the engaged shear slack of the fastening be less than 10 percent (more preferably, less than 8 percent, and in some applications even less than 4 percent) of the overall engaged thickness. In one example, with the hook elements engaging the loop elements at a pull rate of about 0.25 inch (6.3 mm) per minute using a programmable MTS tester, an extension or average shear slack of 0.003 inch (0.076 mm) was measured at the point where the extension force was 0.025 lbf (11 grams).

Shear slack can be adjusted by varying the hook and/or loop characteristics. For example, a loop material having two or more loop sizes will tend to provide a lower shear slack than a material with the single greater loop length, and longer loops generally provide more shear slack than shorter loops. Shear slack may also be varied by varying the hook head thickness or head or stem width or shape. Distribution of male touch fastener elements on a hook fastener component can be selected to achieve a desired shear slack. For example, a checkerboard pattern of male touch fastener elements on a hook fastener component can have less shear slack than aligned rows of similar male touch fastener elements on a hook fastener component. Also, a higher density of male touch fastener elements generally results in lower shear slack than a lower density of similar male touch fastener elements. Thus, a low ratio of shear slack to engaged thickness can be achieved by using a suitable combination of design features.

Figure 20:
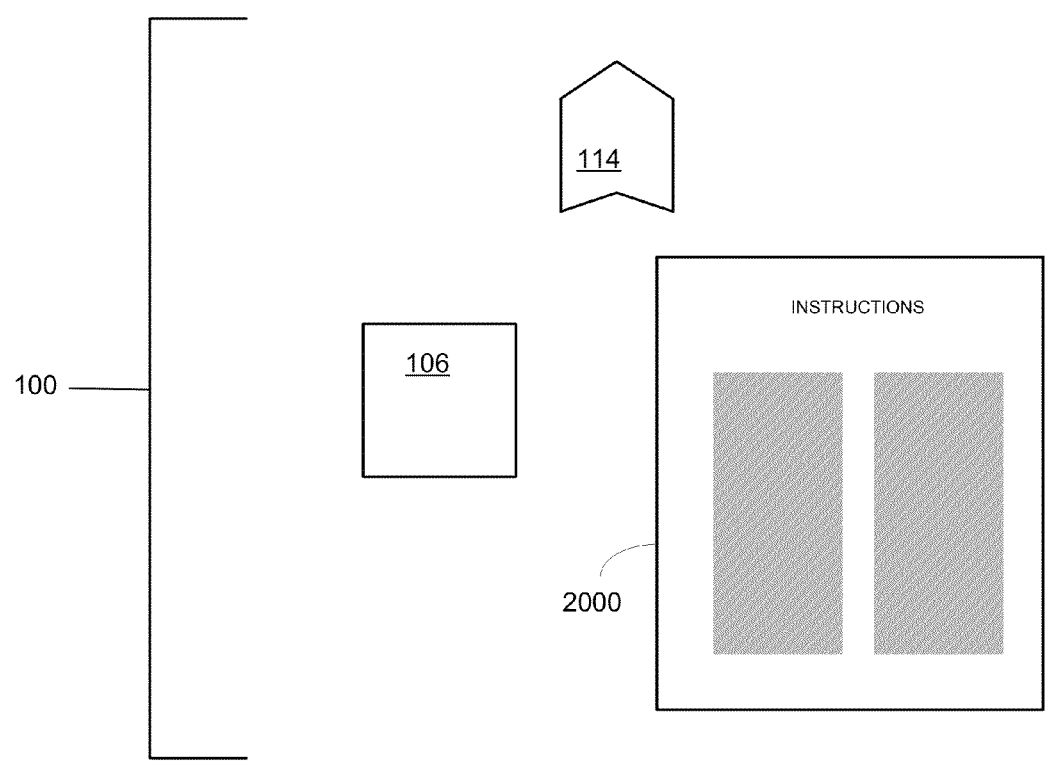
FIG. 20 illustrates a releasable hanging system including instructions for use.

Referring to FIG. 20, a releasable hanging system 100 for releasably hanging an object to a vertical surface includes a loop fastener component 106, a hook fastener component 114, and instructions for use 2000. The instructions may include, for example, text or pictorial instructions for adhering a first one of the fastener components to an object, adhering a second one of the fastener components to a surface from which to hang the object, engaging the loop fastener component and the hook fastener component, and adjusting an orientation of the object with respect to the surface. The instructions may also describe how to remove the first one of the fastener components from the object and the second one of the fastener components from the surface.

While a number of examples have been described for illustration purposes, the foregoing description is not intended to limit the scope of the invention, which is defined by the scope of the appended claims. There are and will be other examples and modifications within the scope of the following claims.

For example, although the description is directed toward a releasable hanging system in which the loop fastener component is secured to the vertical surface and the hook fastener component is adhered to the object such that a significant majority of the male touch fastener elements overhang the base in a downward direction with respect to the vertical surface, in other examples the loop fastener component is secured to the object and the hook fastener component is adhered to the vertical surface such that a significant majority of the male touch fastener elements overhang the base in an upward direction with respect to the vertical surface.

What is claimed is:

1. A releasable hanging system comprising:
   a loop fastener component comprising a flexible patch carrying a field of engageable fibers exposed on a front side of the patch, and an adhesive on a back side of the patch; and
   a hook fastener component comprising a resin base carrying an array of male touch fastener elements, a significant majority of the male touch fastener elements each extending from the base to a distal tip, to overhang the base in a single, common direction;
   wherein the hook and loop fastener components are configured to engage each other to form a releasable fastening having an initial shear resistance, loaded in opposition to the common direction of the significant majority of the male touch fastener elements, that is more than 10 times an initial shear resistance of the releasable fastening loaded in the common direction of the significant majority of the male touch fastener elements.

2. A method of hanging an object, the method comprising:
   selecting a desired orientation of the object with respect to a vertical surface;
   securing a second field of touch fastener elements to a back side of the object;
   releasable engaging a first field of touch fastener elements with the second field of touch fastener elements, one of the first and second touch fastener element fields comprising an array of male touch fastener elements each extending from a common base, the other of the first and second touch fastener element fields comprising a multiplicity of fibers distributed over an area and engageable by the male touch fastener elements; and
   hanging the object on the vertical surface by securing the first field of touch fastener elements to the vertical surface,
   wherein a significant majority of the male touch fastener elements are oriented to overhang the base in a single, common direction, each male touch fastener element of the significant majority extending from the base to a distal tip, and wherein the orientation of the significant majority of the male touch fastener elements is such that, with the object hanging on the vertical surface, the fastener elements of the significant majority bear the weight of the object in a downward direction and such that the significant majority of the male touch fastener elements are oriented so as to not inhibit lifting of the object in an upward direction, and
   wherein the first and second fields of touch fastener elements are of hook and loop fastener components configured to engage each other to form a releasable fastening having an overall engaged thickness of less than about 0.5 millimeters, and an engaged shear slack of less than 10 percent of the overall engaged thickness.

3. A method of hanging an object, the method comprising:
   selecting a desired orientation of the object with respect to a vertical surface;
   securing a second field of touch fastener elements to a back side of the object;
   releasably engaging a first field of touch fastener elements with the second field of touch fastener elements, one of the first and second touch fastener element fields comprising an array of male touch fastener elements each extending from a common base, the other of the first and second touch fastener element fields comprising a multiplicity of fibers distributed over an area and engageable by the male touch fastener elements; and
   hanging the object on the vertical surface by securing the first field of touch fastener elements to the vertical surface,
   wherein a significant majority of the male touch fastener elements are oriented to overhang the base in a single, common direction, each male touch fastener element of the significant majority extending from the base to a distal tip, and wherein the orientation of the significant majority of the male touch fastener elements is such that, with the object hanging on the vertical surface, the fastener elements of the significant majority bear the weight of the object in a downward direction and such that the significant majority of the male touch fastener elements are oriented so as to not inhibit lifting of the object in an upward direction, and
   wherein the first and second fields of touch fastener elements are of hook and loop fastener components configured to engage each other to form a releasable fastening having an initial shear resistance, loaded in opposition to the common direction of the significant majority of the male touch fastener elements, that is more than 10 times an initial shear resistance of the releasable fastening loaded in the common direction of the significant majority of the male touch fastener elements.

4. A method of hanging an object, the method comprising:
   selecting a desired orientation of the object with respect to a vertical surface;
   securing a second field of touch fastener elements to a back side of the object;
   releasable engaging a first field of touch fastener elements with the second field of touch fastener elements, one of the first and second touch fastener element fields comprising an array of male touch fastener elements each extending from a common base, the other of the first and second touch fastener element fields comprising a multiplicity of fibers distributed over an area and engageable by the male touch fastener elements; and
   hanging the object on the vertical surface by securing the first field of touch fastener elements to the vertical surface,
   wherein a significant majority of the male touch fastener elements are oriented to overhang the base in a single, common direction, each male touch fastener element of the significant majority extending from the base to a distal tip, and wherein the orientation of the significant majority of the male touch fastener elements is such that, with the object hanging on the vertical surface, the fastener elements of the significant majority bear the weight of the object in a downward direction and such that the significant majority of the male touch fastener elements are oriented so as to not inhibit lifting of the object in an upward direction, and
   wherein the male touch fastener elements are of a hook fastener component that includes a visible indication, other than orientation of the male touch fastener elements themselves, of the common direction in which the significant majority of the male touch fastener elements overhang the base.

* * * * *

UNITED STATES PATENT AND TRADEMARK OFFICE
CERTIFICATE OF CORRECTION

PATENT NO.        : 8,851,440 B2                                        Page 1 of 1
APPLICATION NO.   : 13/226194
DATED             : October 7, 2014
INVENTOR(S)       : Chang et al.

It is certified that error appears in the above-identified patent and that said Letters Patent is hereby corrected as shown below:

<u>In the Claims</u>

Col. 15, Claim 2, line 39, delete "releasable" and insert --releasably--;

Col. 16, Claim 4, line 39, delete "releasable" and insert --releasably--.

Signed and Sealed this
Twenty-seventh Day of January, 2015

Michelle K. Lee
*Deputy Director of the United States Patent and Trademark Office*